March 18, 1941.　　　A. R. SMITH　　　2,235,539

STRAINER ARRANGEMENT

Filed Aug. 30, 1938

Inventor:
Arthur R. Smith,
by Harry E. Dunham
His Attorney.

Patented Mar. 18, 1941

2,235,539

UNITED STATES PATENT OFFICE 2,235,539

STRAINER ARRANGEMENT

Arthur R. Smith, Schenectady, N. Y., assignor to General Electric Company, a corporation of New York Application August 30, 1938, Serial No. 227,513

1 Claim. (Cl. 183—73)

The present invention relates to strainer arrangements for straining elastic fluid on its path to an elastic fluid turbine or other consumer. More particularly, the invention relates to a type of strainer arrangement in which a cylindrical strainer is centrally disposed within a casing forming an annular channel therewith to which elastic fluid to be strained is conducted. The elastic fluid usually flows to this annular channel at high velocity and when it contains large pieces of foreign matter such as steel, these pieces are thrown back and forth between the strainer and the casing wall, often leading to the destruction of the strainer, in which case such pieces may pass through the strainer and enter the turbine or like consumer, doing considerable damage therein.

The object of my invention is to provide an improved construction of strainer arrangements, especially in conjunction with valves whereby the aforementioned drawback is substantially eliminated.

For a consideration of what I believe to be novel and my invention, attention is directed to the following description and the claim appended thereto in connection with the accompanying drawing.

Figure 1:
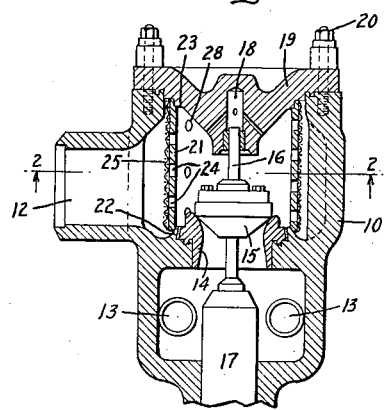
Figure 2:
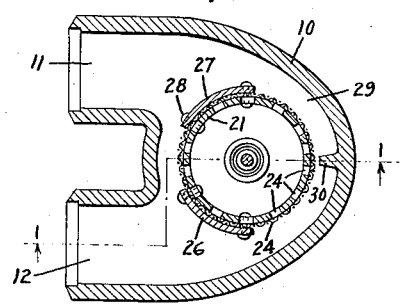

In the drawing Fig. 1 is a sectional view of a strainer arrangement in combination with a valve, and Fig. 2 is a section along line 2—2 of Fig. 1, Fig. 1 being a section along line 1—1 of Fig. 2.

The arrangement comprises a valve body or casing 10 forming two inlet openings 11 and 12 and two outlet openings 13. A ring member 14 secured to the casing 10 intermediate the inlets and the outlets forms a valve seat in cooperative relation with a movable valve disk 15. The disk 15 is fastened to a stem 16 which has a lower portion suitably guided in a sleeve and packing arrangement 17 held in an extension of the casing, and an upper portion which is guided in a bore 18 of a cover 19 secured to the casing by bolts 20. The strainer arrangement for straining elastic fluid on its path through the valve casing comprises a cylinder 21 disposed inside the casing and having a lower end engaging a shoulder 22 formed by the casing and an upper end engaging a shoulder 23 formed by the cover 19. The cylinder 21 has a plurality of spaced openings or perforations 24 and is surrounded by a screen of wire mesh 25. This screen forms the strainer proper and the cylinder forms a backing for the screen to prevent collapsing of the latter due to impact of fluid thereon. The portions of the screen adjacent the inlet openings 11 and 12 are protected from the impact of solid foreign matter by steel plates 26 and 27 secured to the screen and the perforated cylinder by rivets 28.

Elastic fluid conducted through the inlets 11, 12 to the annular channel 29 formed between the casing and the strainer flows through the open portions of the strainer into the interior thereof, whence it is discharged through the outlets 13 with the valve 16 in open position. Foreign matter carried along by the elastic fluid may be conducted to the rear of the channel 19 and then again carried towards the openings due to the whirling and eddies which take place in the channel. During such movement solid pieces may impact any portions of the strainer not protected by walls 26, 27. Therefore it becomes desirable to reduce the tendency of solid foreign matter to move back towards the inlets once it has reached the portion of the channel 29 substantially diametrically opposite the inlets 11, 12. This is accomplished in accordance with my invention by the provision of an obstacle in the rear portion of the annular channel, that is, in that portion which is substantially diametrically opposite the inlets 11, 12. In the present example this obstacle is shown in the form of a web or dam 30 secured to and forming part of the outer casing 10 and projecting inward thereof towards the strainer 21, 25. This dam or partition steadies the flow of fluid and prevents large pieces of solid matter passing from one of the inlets 11, 12 towards the rear of the channel 29 from being carried along the channel towards the other of the inlets 11, 12. In case the arrangement has one inlet opening only, a dam diametrically opposite such opening prevents foreign matter forced into one side of the channel from being carried around to the other side. Solid foreign matter entering the channel 29 and reaching the portion near the dam 30 collects in this portion of the channel without continuously striking back and forth between the casing and the strainer. Fluid flowing at high velocity into the inlet 12 is divided into two parallel streams flowing through the two halves of the annular channel formed between the screen and the casing toward the rib or dam 30. Solid substances are deposited near the dam. The latter as pointed out above prevents such solid substances from being thrown back and forth toward the screen by action of the fluid. It has been found that the fluid flowing through the inlet ordinarily is not evenly distributed between the two halves of the annular channel. In addition, this uneven distribution of fluid between the channel halves may change during operation due to external disturbances in the conduit leading to the inlet. The changing distribution of fluid causes fluctuations in fluid flow through the channel halves. With the provision of a dam as descraibed above, the fluctuations are substantially reduced. The dam calms or steadies the fluid flow.

Thus, with my invention I have provided an improved construction and arrangement for strainers contained in a casing and forming an annular channel to which elastic fluid is conducted at one side thereof. Broadly, my invention includes the provision of means located in said channel substantially diametrically opposite the inlet opening of the casing and preventing or reducing movement of solid matter contained in the elastic fluid from one side of the channel to the other. My invention is particularly useful in arrangements in which the center line of a single inlet intersects normally the center line of the cylindrical screen and the outlet.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

A strainer arrangement for removing solid substances from elastic fluid flowing at high velocity compising a cylindrical casing having inlet means and an outlet coaxial with said casing, the center lines of the inlet means and the outlet being disposed at right angles, a strainer including a cylindrical screen disposed within the casing and forming therewith an annular channel having two halves for receiving fluid from the inlet means, the inlet means being arranged on one side of the casing to discharge fluid in two parallel streams into the two halves of the annular channel, a rib in the channel integral with the casing disposed transversely of the fluid stream substantially diametrically opposite the inlet means to prevent solid matter forced into the annular channel from being thrown back and forth toward the screen by the action of fluid flowing at high velocity in two parallel streams through the two halves of the annular channel.

ARTHUR R. SMITH.